INVENTOR.
Alfred W. Barber

INVENTOR.
Alfred W. Barber 3,332,015
TRANSISTOR CHECKER USING ALTERNATING LINE CURRENT IN PHASE BETWEEN EMITTER AND BASE AND EMITTER AND COLLECTOR FOR TESTING POWER TRANSISTORS
Alfred W. Barber, 32—44 Francis Lewis Blvd., Flushing, N.Y. 11358
Filed Nov. 8, 1963, Ser. No. 322,377
2 Claims. (Cl. 324—158)

The present invention concerns transistor checkers and, in particular, transistor checkers for checking parameters of both general purpose and power transistors.

Many devices have been proposed and some have been manufactured for measuring the various parameters of transistors. However, power transistor checking has remained a time consuming procedure with all but the simplest checkers and these latter do not provide sufficient information to be meaningful. Among the characteristics which are important in most power transistor circuits are breakdown voltage, saturation voltage and current gain at a reasonably high current. The first two tests are also important in rectifier circuits. In order to make these tests with direct current large, well filtered DC power supplies or large, heavy batteries are required. An additional problem is that overheating, of the transistor may take place unless the DC testing is done quickly and there is always the possibility that too much time may be taken. Pulse testing is a possibility but this requires even more elaborate and expensive equipment.

It has been found according to the present invention, that ordinary power line alternating current may be used for the power transistor testing with resulting simple, light and inexpensive equipment and with the important and unexpected result that the transistors are not overheated in the process. It has also been found that by the addition of a light duty rectifier and capacitor that the same power source can be converted to DC for general purpose transistor and diode testing. The entire equipment has worked out to be simple, light, small, inexpensive and versatile and to provide extremely rapid checking means for power transistors, rectifiers, general purpose transistors, diodes and the like.

Accordingly the main object of the present invention is to provide methods of and means for checking a maximum number of both general purposes, power transistors, diodes and rectifiers in an absolute minimum of time, of the order of three seconds.

Another object is to check power transistors, rectifiers and the like with alternating current permitting relatively high voltages and heavy currents to be used without the inconvenience or expense of filtered DC power supplies or batteries.

A further object is to combine general purpose and power transistor checking means for greatest economy and maximum utility.

A still further object is to combine a rectified DC power supply with an AC power source for checking general purpose and power transistors respectively.

Another object is to provide a combined general purpose and power transistor checker with a greatly reduced number of component parts.

These and other objects will be apparent from the detailed description of the invention given in connection with the various figures of the drawing.

In the drawing:
FIGURE 1 is a schematic circuit diagram of the present invention.

Figure 1:
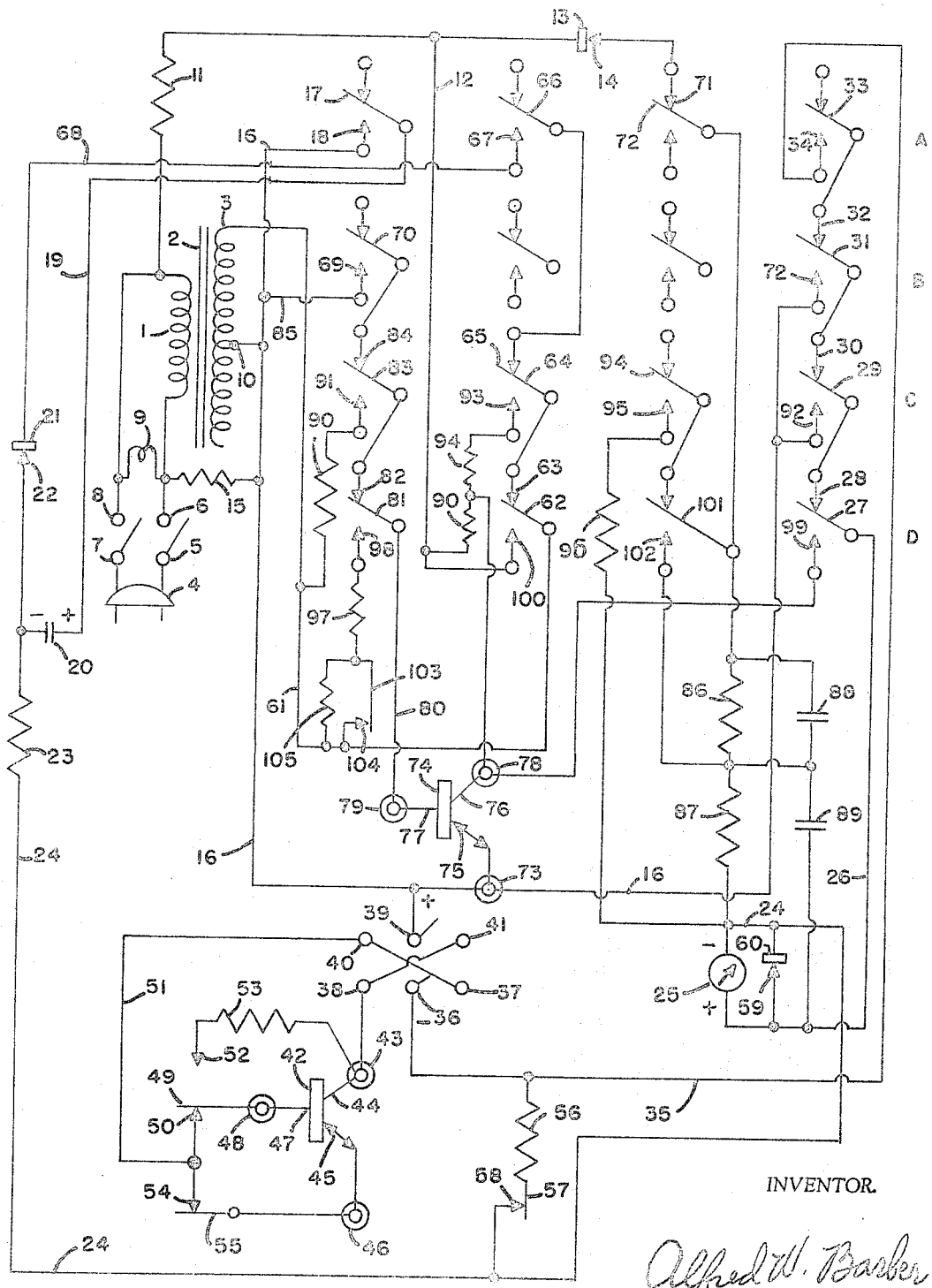

FIG. 1 shows the circuits controlled by four push-button switches arranged in rows designated A, B, C, and D. All of these switches are shown in their off positions in which positions the movable contact arms are placed in an upward direction. Each of these push-button switches includes four single pole double throw switches although not all contacts are used in every case.

The A switch closes the circuits utilized in the general purposes transistors checking operation and its functioning will be described first. The general purpose transistor checking utilizes a low voltage step-down current transformer and a low voltage rectifier and filter direct current circuit. The step-down alternating current transformer includes a primary 1, core and secondary 3. Primary 1 is connected through on-off power switch 5–6–7–8 to a plug 4 suitable for connection to an alternating current power line, not shown. A pilot lamp 9 is provided connected across primary 1 to indicate when power is turned on. The secondary voltage taken across secondary 3 or a suitable portion as at tap 10 as shown is applied over leads 16 and 61 to rectifier 21–22 and filter capacitor 20 to provide low voltage direct current for operation of the general purpose transistor checking circuits. The circuits from lead 16 to the positive side of capacitor 20 may be traced through switch contacts 17–18 which will be closed since push-button A is closed (contact arms moved downward) for the general purpose transistor checking. The circuit from lead 61 can be traced through contacts 62–63, 64, 65 which will be closed since push-button B, C and D will be off, and contacts 66–67 and lead 68 to cathode 21 of rectifier 21–22. The anode 22 is connected to the negative side of filter capacitor 20 and one end of current limiting resistor 23. In this way a low voltage direct current voltage is provided between leads 16 and 24. Lead 24 is continued to the negative side of meter 25. The circuit continues through meter 25 and over lead 26, through contacts 27–28, 29–30, 31–32, and 33–34 to lead 35 to contact 36 of double pole double throw switch 36 through 41. This switch is utilized to reverse the polarity of the direct current voltage to the transistor circuit permitting the checking of either PNP or NPN transistors. When this switch is closed with contacts 36–37 and 39–41 closed, positive bias from lead 16 is supplied to collector terminal 43 and the negative return through meter 25 is made to over lead 51. On the other hand, when this switch is closed with contacts 36–38 and 39–40 closed negative bias over lead 35 and through meter 25 is supplied to collector terminal 43 and the positive return is made to lead 51. The testing of general purpose transistors consists in an $I_{CES}$, an $I_{CBO}$ and a beta test. In order to make the $I_{CES}$ test, meter shunt 56 is opened by opening switch contacts 57–58 providing meter 25 with full sensitivity. In order to make the $I_{CBO}$ test, switch contacts 57–58 are kept open to maintain full meter sensitivity and switch contacts 54–55 are opened so that the leakage from collector to base is measured. In order to make the beta test, switch arm 49 is switched from contact 50 to contact 52 in order to provide a predetermined base current to base terminal 48 through resistor 53. Meter 25 is calibrated by means of shunt 56 to read beta as the current gain between base and colletcor. The collector terminal 43, base terminal 48 and emitter terminal 46 may be taken to represent transistor socket terminals or pin jack terminals for connection to collector 44, base 47 and collector 45 respectively of a transistor 42 to be tested or checked. When tests are to be made on power transistors, push-button switch A is released returning its movable contact arms to their upper positions.

Power transistor tests are made by actuating one of push-button switches B, C or D while push-button A is maintained in its off or up position. When push-button B is depressed, contacts 69–70, 31–72 and 71–72 are closed. Under these conditions the full alternating current line voltage across primary 1 is applied to the test circuit through current limiting resistors 11 and 15. The circuit through resistor 15 passes over lead 16 to emitter terminal of the power transistor 74 to be tested. Lead 16 is continued to the positive side of meter 25 through the closed switch contacts 31–72, 29–30 and 27–28 and over lead 26. Base terminal 79 is connected to emitter terminal 73 over lead 80, through closed switch contacts 81–82, 83—84 and 69–70 and over leads 85 and 16. The other side of the test voltage across primary 1 is conducted through 11 to rectifier 13 and the resulting negative pulses are applied through switch contacts 71–72 to series resistors 86 and 87 by-passed by capacitors 88 and 89 respectively to the negative side of meter 25. This other side of the high test voltage is also applied over lead 12 and through resistor 90 to collector terminal 78. The transistor 74 to be tested is connected with its emitter 75 going to terminal 73, its base 77 going to terminal 79 and its collector 76 going to terminal 78. With the relatively high voltage as just described applied between collector 76 and base 77 tied to emitter 75, the transistor will start to conduct negative pulses from collector to emitter and base at some voltage directly related to its $BV_{CES}$ or "collector to emitter with base shorted" break down voltage. The meter 25 as has been stated above will read these negative pulses and hence will indicate $BV_{CES}$. The values of resistors 11 and 15 may be chosen to provide any desired current at which this test is to be made as, for example, 10 milliamperes. It is desirable to chose some such low current also in order to prevent shock hazard when using this tester.

The second power transistor test is for saturation voltage and is made with push-button C down and all other push-buttons up. This test is made at a low voltage utilizing the line frequency half cycle pulses from secondary 3. This is done without opening the high voltage circuit since the low voltage circuit is relatively a much lower impedance circuit and when connected in parallel dominates the situation. The saturation voltage test consists in over driving the base of the transistor and measuring the resulting collector voltage drop. The base drive is provided from low voltage secondary 3 over lead 61 and through base current limiting resistor 90, switch contacts 83–91 and lead 80. The common side of the circuit is made from tap 10 over lead 16 to emitter 75 and through switch contacts 29–92 and 27–28 and lead 26 to the positive side of meter 25. The collector voltage pulses are supplied from secondary 3 over lead 61 and through switch contacts 62–63 and 64–93 and resistor 94 to collector terminal 78. Measurement of the resulting collector drop is provided by rectifier 13 coupled to collector 76 through resistor 90 and being coupled to the negative side of meter 25 through switch contacts 94–95 and voltage sensitivity determining resistor 96.

The third power transistor test is for beta i.e. the transistor base to collector current gain. The circuits for this test are set up by closing push-button switch contacts D (closing all circuis to the lower position). These connections provide a predetermined current to the test transistor base and measure the resulting amplification of current in the collector circuit. The predetermined base current is provided from low voltage secondary 3 over lead 61 and through current determining resistor 97, switch contacts 81–98 and lead 80 to base terminal 79 and base 77. The return side of the circuit from tap 10 is made over lead 16 to base terminal 73 and base 75. The resulting collector current is measured by measuring the voltage drop across a low resistance 90 connected in series between winding 3 over lead 61 and collector terminal 78 and collector 76 through switch contacts 62–100. The voltmeter circuit for making this voltage measurement is accomplished by rectifier 13 connected to one end of resistor 90 over lead 12 and to meter multiplier 87 through switch contacts 101–102 and by the return of the positive side of meter 25 over lead 26 and switch contacts 27–99 to collector terminal 78 and collector 76. The fourth power transistor test measures the equivalent input impedance of the transistor. This is accomplished by increasing the base series resistance by a known amount as, for example, by doubling it and measuring the resulting decrease in collector current. This resistor is resistor 105 connected in series with base resistor 97 and normally shorted by normally closed push-button switch 103–104. When switch 103–104 is opened, the resistor 105 is placed in series with the test transistor base and the resulting change in collector current is read on the meter 25.

When measurements are transferred from general purpose transistor testing to power transistor testing, the low voltage bias across filter capacitor 20 may be connected across meter 25 through resistor 23. To prevent excessive current flow in meter 25, diode 59–60 may be connected across the meter terminals.

Figure 2:
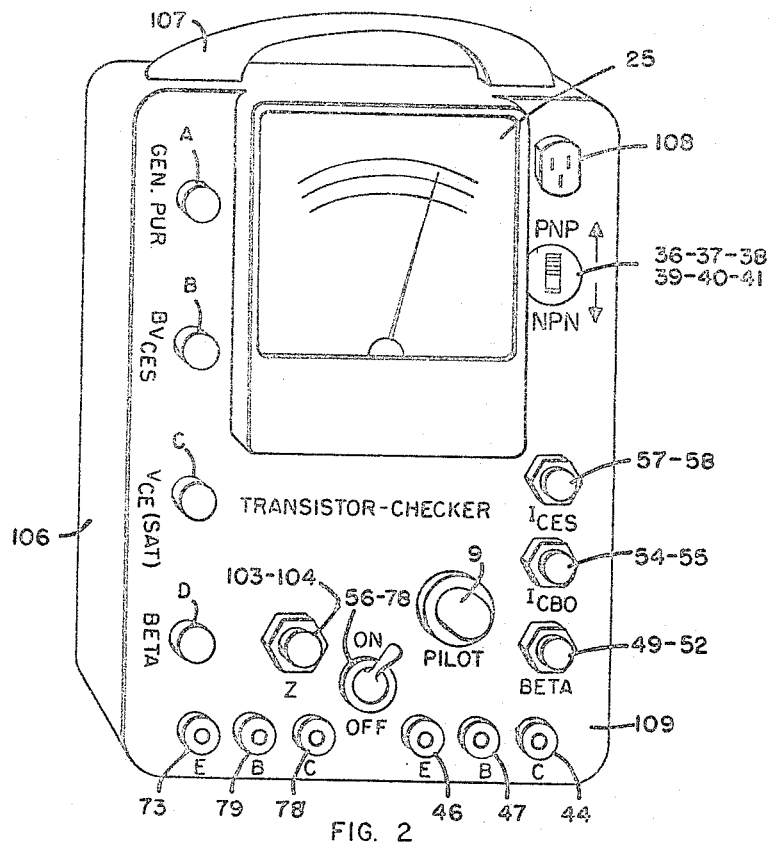
FIGURE 2 is an external view of one form of unit packaging of the present invention.

FIG. 2 is a perspective view of a complete tester embodying the circuits of the present invention. The mechanical parts of the push-buttons and switches are numbered or lettered to identify them with the circuit parts as shown in FIG. 1. A convenient case houses the tester and a handle 107 may be provided. A general purpose transistor socket 108 may be provided with its terminals connected to the jacks 46–47–44. The panel 109 may be appropriately lettered to indicate the various test push-buttons and switches.

Figure 3:
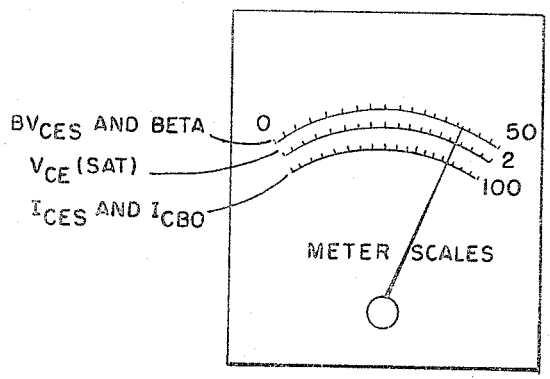
FIGURE 3 is a meter scale suitable for use in the unit utilizing the present invention.

FIG. 3 shows one possible form of meter scale suitable for use in the tester. Since the $BV_{CES}$ and Beta scales are essentially linear and conveniently have a maximum of the order of 150, they may be combined as shown. Similarly the $I_{CBO}$ scales may be combined with, for example, 100 microamperes as full scale value. The $U_{CE}$ (SAT) scale will be approximately 2 volts AC full scale and will be non-linear due to the typical non-linearity of a low voltage AC scale.

Some of the features and advantages of the tester in accordance with the present invention will now be pointed out. The power transistor tests are made on essentially half cycle pulses of the power line frequency reducing the duty cycle to a fraction of what it would be were DC utilized. This reduces heating effects to a point where relatively high voltage, high current tests can be made without danger of over-heating the transistor being tested. The high voltage tests are made with current limiting resistors so that harmful current can never be passed through the transistor. The impedance of the low voltage test circuit is so low that it can be shunted across the high voltage, current limited circuit without danger or interaction. The current limiting of the high voltage test circuit renders the tester safe to use under any condition.

Two outstanding advantages are provided by the tester. First, the circuits have been so simplified and combined as to provide a very inexpensive tester. Second, the tester is preset and push-button operated, each test requiring the pressing of a single button so that testing is extremely rapid. Actually a transistor can be completely checked in 3 seconds or less.

While only a single embodiment of the present invention has been shown and described, many modifications will be apparent to those skilled in the art and within the spirit and scope of the invention as set forth in particular in the appended claims.

What is claimed is:
1. A transistor tester comprising, in combination;
   an alternating current stepdown transformer including a primary adapted for connection to a source of 60 cycle alternating current power and a low impedance, low voltage secondary;
   three terminals adapted for connection to the collec- tor, emitter and base of a power transistor respectively;

a first current limiting resistor and circuit means for coupling one side of said primary with said collector terminal, a second current limiting resistor and circuit means for coupling the other side of said primary with one of the remaining terminals switch means for connecting the latter said terminal to the second remaining terminal;

a rectifier, a resistor, an indicating meter and switch means for connecting said rectifier, resistor and meter in a series circuit and said series circuit in shunt with said collector terminal and one of said remaining terminals wherein said rectifier and meter are polled to indicate the peak voltage of a transistor connected to said terminals in response to the limited alternating current across said primary in the current blocking direction;

circuit means for connecting the first side of said secondary to said emitter terminal;

a resistor and connected switch means for connecting the second side of said secondary to said base terminal;

a resistor and connected switch means for connecting said second side of said secondary to said collector terminal;

circuit means including a switch for connecting said meter in shunt across said collector and emitter terminals for measuring the saturation voltage of a transistor connected to said terminals;

circuit means including a switch for connecting said meter in shunt with the last said resistor for measuring collector current of a transistor connected to said terminals;

a resistor and switch means in series for connecting the last said resistor in series with said base connected resistor whereby the input impedance of a transistor connected to said terminals is indicated by a change in the collector current indication.

2. A transistor tester as set forth in claim 1 and including additional transistor test circuits adapted to perform DC tests of transistors;

a rectifier, filter to said secondary for providing a source of DC;

switch means for connecting said additional transistor test circuits with said source of DC;

means for connecting said meter with said additional transistor test circuits for indicating said tests;

and means for connecting a transistor to be tested with said additional test circuits.

References Cited

UNITED STATES PATENTS 2,697,814 12/1954 Grant _____ 324—158 X
2,907,954 10/1959 Radcliff _____ 324—158
2,911,594 11/1959 Knight _____ 324—158
2,982,916 5/1961 Loesch _____ 324—158

OTHER REFERENCES

Electronics (Breslow), Jan. 6, 1961, pp. 120–122.

Motorola Power Transistor Handbook (first edition), 1961, pp. 159–160.

Radio-Electronics (Jordan et al.), November 1958, pp. 59–61.

WALTER L. CARLSON, *Primary Examiner.*

E. L. STOLARUN, *Assistant Examiner.*